United States Patent
Igarashi (10) Patent No.: US 6,952,588 B1
(45) Date of Patent: Oct. 4, 2005

(54) RADIO TELEPHONE SYSTEM (75) Inventor: Chiaki Igarashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/415,205

(22) Filed: Oct. 12, 1999

(30) Foreign Application Priority Data

Oct. 12, 1998 (JP) .......................................... 10/288961

(51) Int. Cl.[7] .................................................. H04Q 7/20
(52) U.S. Cl. ........................ 455/463; 455/464; 455/465
(58) Field of Search ................................ 455/462, 463, 455/464, 465, 74.1, 88, 426.1, 426.2; 379/423, 424

(56) References Cited

U.S. PATENT DOCUMENTS

| | | | | |
|---|---|---|---|---|
| 5,375,163 A | * | 12/1994 | Kamimoto et al. | 455/464 |
| 5,495,520 A | * | 2/1996 | Kojima | 455/411 |
| 5,581,598 A | * | 12/1996 | Hachiga | 455/462 |
| 5,722,054 A | * | 2/1998 | Mizutani et al. | 455/88 |
| 5,787,356 A | * | 7/1998 | Tanaka et al. | 455/464 |
| 6,005,869 A | * | 12/1999 | Sakai et al. | 370/452 |
| 6,097,968 A | * | 8/2000 | Bannister et al. | 455/561 |
| 6,212,221 B1 | * | 4/2001 | Wakayama et al. | 375/133 |
| 6,314,298 B1 | * | 11/2001 | Hiroki | 455/465 |
| 6,327,477 B1 | * | 12/2001 | Hachimura et al. | 455/464 |
| 6,606,491 B1 | * | 8/2003 | Peck | 455/411 |
| 6,618,587 B1 | * | 9/2003 | Ghafoor | 455/419 |

FOREIGN PATENT DOCUMENTS

| | | | | |
|---|---|---|---|---|
| JP | 05102921 A | * | 4/1993 | ............ H04B/7/26 |
| JP | 5-252243 | | 9/1993 | |
| JP | 5-292016 | | 11/1993 | |
| JP | 5-327608 | | 12/1993 | |
| JP | 7-245785 | | 9/1995 | |
| JP | 8-331081 | | 12/1996 | |
| JP | 9-247083 | | 9/1997 | |
| JP | 9-321697 | | 12/1997 | |
| WO | WO 97/38370 | * | 10/1997 | |

* cited by examiner

Primary Examiner—Erika A. Gary
(74) Attorney, Agent, or Firm—Sughrue Mion, PLLC

(57) ABSTRACT

In the radio communication control of the slave telephone set with a unit ID in one-to-one correspondence to one slave telephone set, in order to assign two or more communication channels to one slave telephone set for radio communication, a plurality of unit IDs are registered in each slave telephone set are also registered in the master telephone set.

13 Claims, 4 Drawing Sheets

PRIOR ART

RADIO TELEPHONE SYSTEM

BACKGROUND OF THE INVENTION

The present invention relates to radio telephone systems such as cordless telephones which perform communication with the remote caller (opposite side) through connection a public telephone line or network by radio communication between a slave telephone set and its master telephone set.

In the radio communication system, communication with its master telephone set is performed through the connection of the slave telephone set to the public telephone network for communication with the opposite side by the radio communication. Radio communication systems include analog ones such as cordless telephone sets utilizing analog radio communication and digital ones such as PHSs (personal handy phone systems).

In the PHS, it is possible to use the same slave telephone set (terminal) for communication both indoors (i.e., in home or in office) and outdoors. Indoors, the slave telephone set can be connected to the public telephone network by its master telephone set. Outdoors, it can be connected to the public telephone network via a base station installed by a dealer. In the PHS, it is also possible that slave telephone sets be used for communication between them just like transceivers without agency of any base station.

It is prescribed as standard to register ID codes for identifying units in both the master and slave telephone sets in the radio communication system. In the manufacture of the master and slave telephone sets, unit IDs are each registered in each of the master and slave units. Unit IDs preliminarily registered in slave units are registered in master units by registering operation, and unit IDs preliminarily registered in the master telephone sets are registered in the slave units. Unless unit IDs are identical, it is impossible to start radio communication.

The mutual recognition of the units of the master and slave telephone sets with unit IDS, is performed in order to prevent erroneous line connection between master and slave telephone sets of different users, such as an erroneous call to the own telephone set instead of a set in the next-door house or to the next-door house set instead of the own set.

In the radio communication system, a plurality of slave telephone sets can make radio communication to a single master telephone set. The master telephone set with registered unit IDs of a plurality of slave telephone sets, can discriminate each slave telephone set with the unit ID thereof, thus controlling the radio communication from each slave unit.

Figure 3:
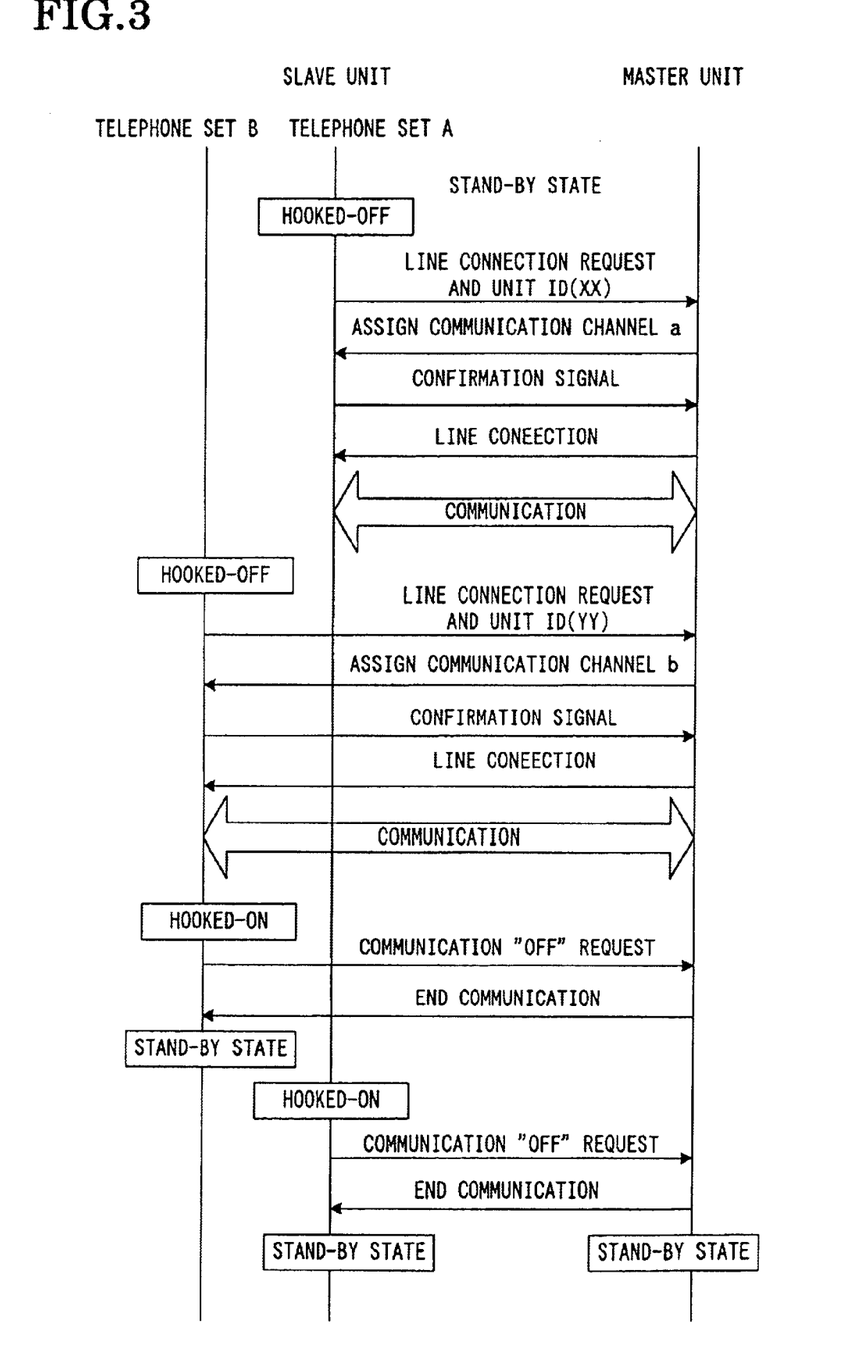
FIG. 3 is a view showing a control sequence in the radio telephone system in this embodiment.
Figure 4:
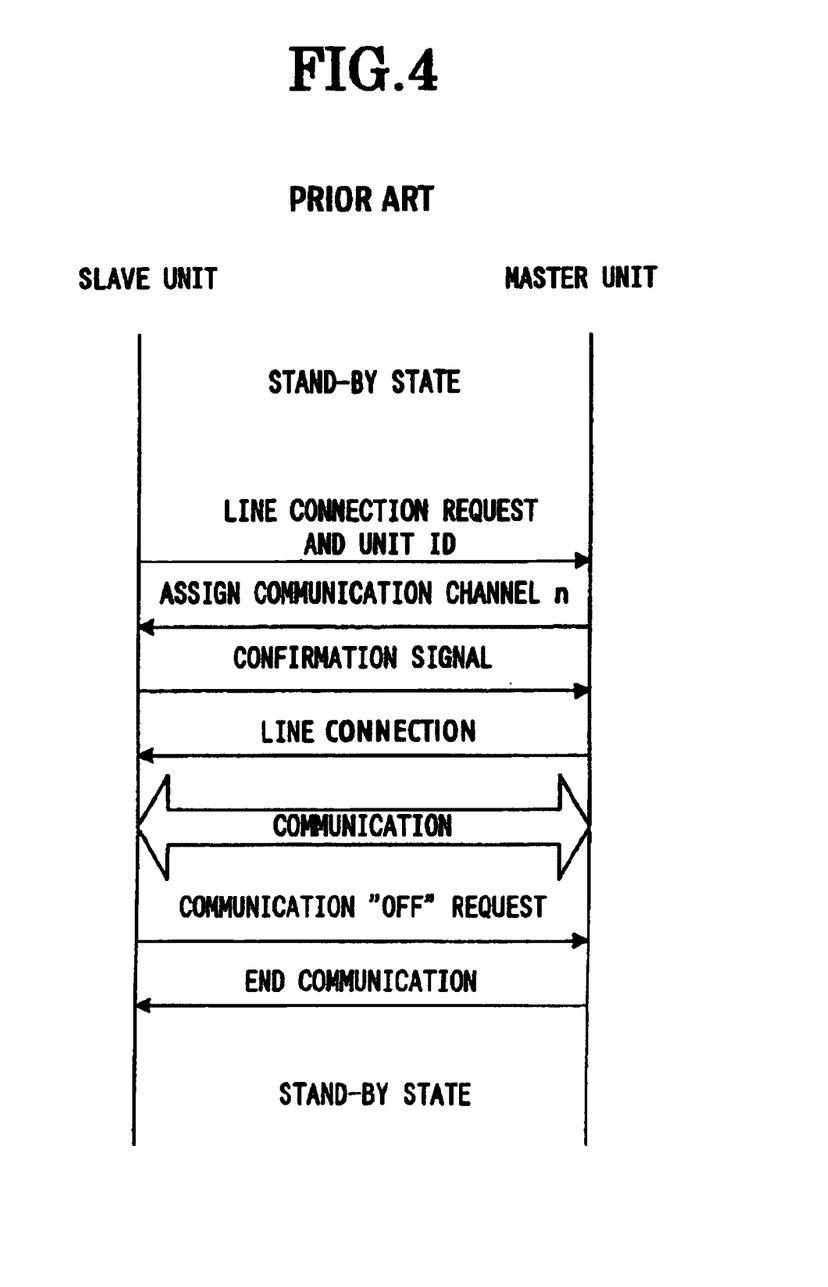
FIG. 4 is a view showing a control sequence in the prior art radio telephone system.

An operational example of radio communication using a channel between a master telephone set and a slave telephone set in a prior art radio telephone system will now be described. FIG. 3 is a view showing a control sequence in the prior art radio telephone system. The master and slave telephone sets in the radio telephone system are waiting with an out-of-use control channel found at hand for use at any time.

When the master receives the line connection request and the unit ID, it checks whether the received unit ID is of its own slave telephone set. If the two unit IDs are identical, the master telephone set finds a vacant communication channel, and assigns the found vacant communication channel n to the slave telephone set.

When the communication channel n is assigned, the slave telephone set checks that the channel n is vacant. If it is O.K., the slave telephone set transmits a confirmation signal. When the master telephone set receives the confirmation signal from the slave telephone set, it executes an operation of line connection to the public telephone network (i.e., a switch). When the line connection is completed, the master telephone set connects the line to the slave telephone set via the communication channel n.

Subsequently, like the operation in the ordinary telephone set, the telephone number of the opposite side is dialed, and the communication is started. When on-hook is performed on the slave telephone set side, a communication "off" request is transmitted from the slave telephone set to the master telephone set. In response to receipt of the communication "off" request, the master telephone set transmits a communication "off" signal to the slave telephone set, thus ending the communication. Then, both the master and slave telephone sets restore their stand-by state again.

As described above, in the prior art radio telephone system the master telephone set assigns a communication channel to the slave telephone set for the radio communication by recognizing the slave telephone set based on a unit ID, which is one-to-one correspondence to one slave telephone set. That is, the radio communication of the slave telephone set is controlled with the unit ID in one-to-one correspondence to one slave telephone set. In other words, it is contemplated only to assign a single communication channel to one slave telephone set for the radio communication, and it is not considered to assign two or more channels for the radio communication.

If it is intended to assign two or more communication channels for communication to one standard slave telephone set, for which only a single unit ID is preliminarily registered as noted above, the master telephone set has to control radio communication with its own control system in addition to the radio communication control with the unit ID since the master telephone set can not control a plurality of communication channels by one unit ID. This posed a problem that the unit construction of the radio communication system (or master telephone set) is complicated and the slave unit control operation becomes more cumbersome.

Moreover, in the prior art radio communication system, in case when a plurality of slave stations simultaneously start communication with one master telephone set by using two or more communication channels, the traffic (i.e., line utilization status) is extremely increased because usually at most three or four channels are provided as radio lines. This leads to a problem of readier generation of a status, in which radio communication between the master telephone set and a slave telephone set is difficult.

SUMMARY OF THE INVENTION

The present invention was made in order to solve the above problems, and its object is to provide a radio telephone system, in which one slave telephone set can simultaneously use two or more channels for radio communication.

Another object of the present invention is to provide a radio telephone system capable of reducing the traffic in the master telephone set even when a plurality of slave telephone sets start communication by using two or more communication channels.

According to an aspect of the present invention, there is provided a radio telephone system, in which a plurality of slave telephone sets is connected to a public telephone network through radio communication with a master telephone set, wherein: a plurality of unit IDs are preliminarily registered in each of the slave telephone sets, and the plurality of unit IDs are also registered in the master telephone set.

According to another aspect of the present invention, there is provided a radio telephone system, in which a plurality of slave telephone sets is connected to a public telephone network through radio communication with a master telephone set, wherein: a plurality of unit IDs is preliminarily registered in each of the slave telephone sets, and the plurality of unit IDs is also registered in the master telephone set and whenever each slave telephone set makes radio communication with the master telephone set, a unit ID corresponding to the radio communication is selected.

The plurality of unit IDs registered in each slave telephone set are registered in a plurality of master telephone sets.

Each slave telephone set is capable of utilizing both analog radio communication and also digital communication.

According to another aspect of the present invention, there is provided a radio telephone system, in which a plurality of slave telephone sets is connected to a public telephone network through radio communication with a master telephone set and a plurality of unit IDs is preliminarily registered in each of the slave telephone sets, and the plurality of unit IDs is also registered in the master telephone set, the system including steps of: in response to hooked off of a first telephone set call to the opposite side, transmitting a line connection request signal and selected unit ID among the preliminarily registered unit IDs on a control channel to the master telephone set; in response to receipt of the line connection request and the unit ID, checking whether the received unit ID is of its own slave telephone set by the master telephone set; if the unit IDs is identical, finding a vacant communication channel and assigning this vacant communication channel to the slave telephone set; in response to the assignment of communication channel, checking whether that communication channel is vacant and, if it is vacant, transmitting a confirmation signal by the slave telephone set; and in response to receipt of the confirmation signal from the slave unit, executing operation of line connection to the public telephone network by the master telephone set.

When a second telephone set is hooked off to make a telephone call to the opposite side while the first telephone set is in communication, a line connection request and the unit ID are transmitted on the control channel to the unit ID; and the line connection like for the first telephone set is executed to obtain connection between the second telephone set and the public telephone network line.

When the second telephone set is hooked on to discontinue its communication in the state that both the first and second telephone sets are in communication, a communication "off" request is transmitted from the second telephone set to the master telephone set; and in response to receipt of the communication "off" signal, the master telephone set transmits a communication "off" signal to the second telephone set, thus ending the communication and restore the second telephone set to the stand-by state.

When the first telephone set is hooked on, a communication "off" request is transmitted from the first telephone set to the master telephone set; and in response to receipt of the communication "off" request, the master telephone set transmits a communication "off" signal to the first telephone set, thus ending the communication and restore the telephone set to the stand-by state.

According to a further aspect of the present invention, there is provided a radio telephone system, in which a plurality of slave telephone sets is connected to a public telephone network through radio communication with a master telephone set and a plurality of unit IDs is preliminarily registered in each of the slave telephone sets, and the plurality of unit IDs is also registered in a plurality of master telephone sets, the system including steps of: responsive to arrival of a telephone call, informing the call arrival to the slave telephone set and transmitting its unit ID by the master telephone set; checking whether the two unit IDs are identical and selecting one of the plurality of unit IDs registered if they are identical and transmitting the selected unit ID to the master telephone set by the slave telephone set; finding a vacant communication channel for communication and informing the found communication channel to the slave telephone set by the master telephone set; checking whether the received communication channel is vacant and if it is vacant, transmitting a confirmation signal by the slave telephone set; and sending out via the communication channel an instruction to ring the bell to the slave telephone set when state ready for communication is brought about.

The master telephone set sends out via the communication channel an instruction to ring the bell to the slave telephone set.

Other objects and features will be clarified from the following description with reference to attached drawings.

PREFERRED EMBODIMENTS OF THE INVENTION

Preferred embodiments of the present invention will now be described with reference to the drawings.

Figure 1:
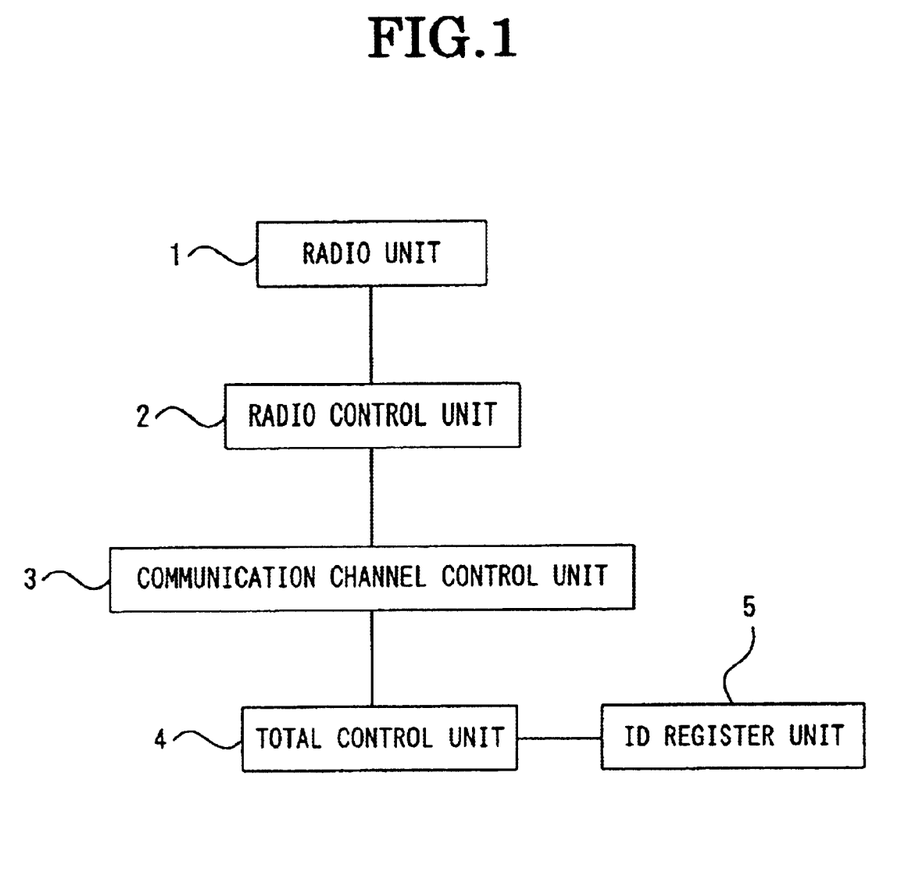
FIG. 1 is a block diagram showing the construction of a slave telephone set of the radio telephone system embodying the present invention.

FIG. 1 is a block diagram showing the construction of a radio telephone system embodying the present invention. Referring to the Figure, a radio unit 1 has a function of transmitting and receiving data to and from a radio line used for radio communication with the master telephone set. A radio control unit 2 has a modulating function providing data to be transmitted to the radio line, a demodulating function of taking out or extracting the data from the radio line and a ratio control function of controlling the operation of the radio unit 1.

A communication channel control unit 3 has a unit ID selecting function of flexibly selecting, whenever the radio communication is performed, the unit ID corresponding to the radio communication among a plurality of unit IDs preliminarily registered in an ID register unit 5. A total control unit 4 controls whole radio communication controls of all slave units. In the ID register unit 5, a plurality of unit IDs preliminarily registered at the time of the manufacture of the slave controls the radio communication control and line communication control. In the ID register unit 15, a plurality of unit IDs preliminarily registered at the time of the manufacture of the slave unit are registered. The unit ID of the master telephone set is also registered in the ID register unit 5 by the registering operation. The line control unit 16 controls the public telephone network.

Although not shown in FIG. 1, a plurality of telephone sets for making communication are connected to the slave telephone set. The number of the telephone sets may be equal to or different from the number of unit IDs registered in the ID register unit 5 of the slave unit.

In the slave telephone set in this embodiment, unlike the standard slave unit in the prior art described above, a plurality of unit IDs can be preliminarily registered, and the communication channel control unit can flexibly select a unit ID corresponding to the radio communication.

As described above, in the standard slave telephone set only a single unit ID is registered in one slave unit, and only a single communication channel is assigned to one slave unit for communication from the necessity of providing one-to-one correspondence between the communication channel and the unit ID. In the slave unit in this embodiment, a plurality of unit IDs are preliminarily registered, and two or more communication channels can be simultaneously assigned for radio communication.

In addition, in the slave telephone set in this embodiment, when radio communication is made, the communication channel control unit 3 can flexibly select a unit ID corresponding to the radio communication. Thus, when the radio communication is performed by using two or more communication channels, it is possible to deal with (or control) the radio communication via the individual communication channels independently of the slave telephone sets. It is thus possible to have radio communication using two or more communication channels be connected to separate or different master telephone sets.

Figure 2:
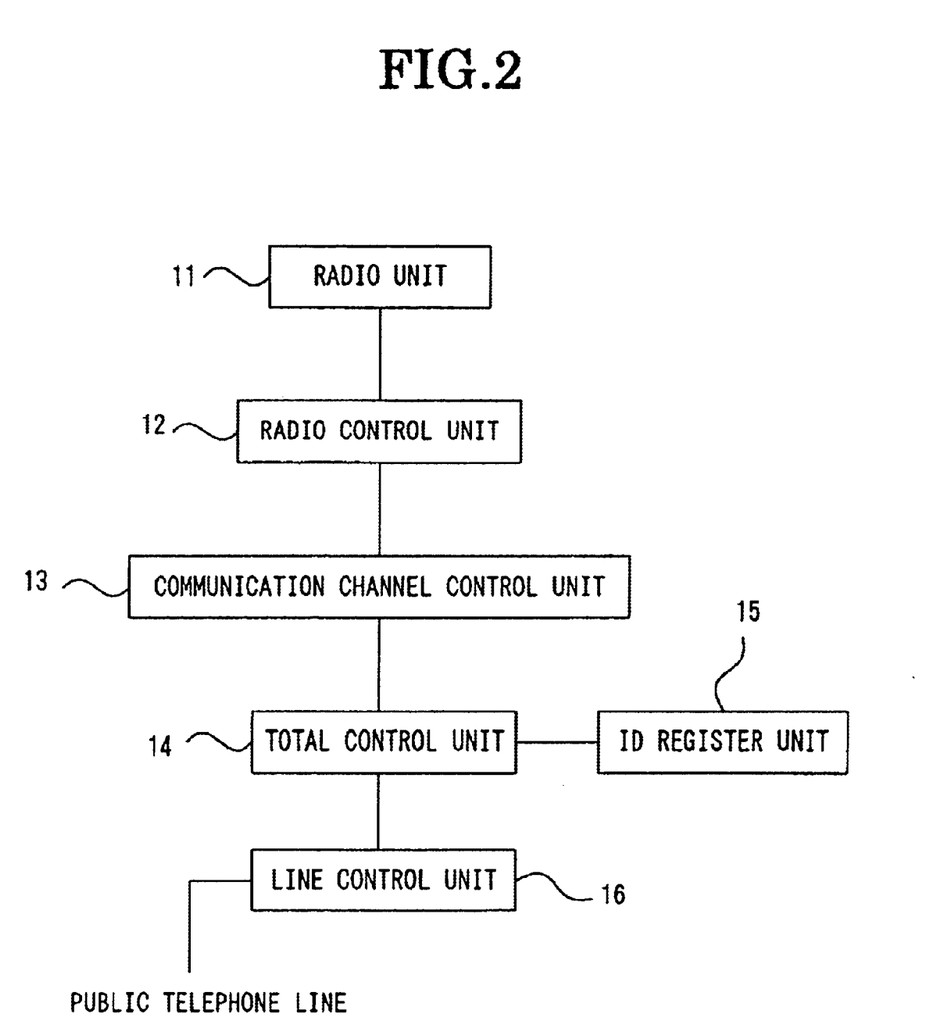
FIG. 2 is a block diagram showing the construction of a master telephone set of the radio telephone system.

The master telephone set has the similar construction as the standard master telephone set. Referring to FIG. 2, the master telephone set includes a radio unit 11, a radio control unit 12, communication channel control unit 13, a total control unit 4, an ID register unit 5 and a line control unit 16. The radio unit 11 has a function of transmitting and receiving data to and from a radio line used for radio communication with the slave telephone set. The radio control unit 12 has a modulating function providing data to be transmitted to the radio line, a demodulating function of taking out or extracting the data from the radio line and a ratio control function of controlling the operation of the radio unit 11. The communication channel control unit 13 has a unit ID selecting function of flexibly selecting, whenever the radio communication is performed, the unit ID corresponding to the radio communication among a plurality of unit IDS preliminarily registered in an ID register unit 15. The total control unit 14 controls the radio communication control and line communication control. In the ID register unit 15, a plurality of unit IDs preliminarily registered at the time of the manufacture of the save unit are registered. The unit ID of the master telephone set is also registered in the ID register unit 5 by the registering operation. The line control unit 16 controls the public telephone network.

In the master telephone set, a plurality of unit IDs preliminarily registered in the ID register unit 5 of the slave telephone set are registered.

The operation of the embodiment will now be described. FIG. 3 is a view showing a control sequence in the radio telephone system in this embodiment. In the radio telephone system to be described with reference to FIG. 3, two unit Ds (XX, YY) are registered in the slave unit at the time of the manufacture. The IDs (XX, YY) of the slave telephone set are also registered in the master telephone set by a registering operation. Two telephone sets A and B are connected to the master telephone set.

When the master and slave telephone sets are not in communication, they are in a standby state. When the telephone set A connected to the master unit is hooked off to make (or transmit) a telephone call to the opposite side, a line connection request is transmitted on the control channel to the master set. At this time, a unit ID (XX) which is flexibly selected by the communication channel control unit 3 among the unit IDs (XX, YY) registered in the ID register portion 5, is also transmitted.

In response to receipt of the line connection request and the unit ID (XX), the master telephone set checks whether the received unit ID (XX) is of its own slave unit. At this time, the master telephone set need only check whether the unit ID (XX) is of its own slave telephone set, and does not need to check which telephone set of that slave telephone set is in use. If the two unit IDs are identical, it can be judged that the line connection request is of its own slave telephone set and not of erroneous connection. When the master telephone set determines that the unit IDS (XX) is identical, it finds a vacant communication channel, and assigns this vacant communication channel a to the slave unit.

In response to assignment of the communication channel a, the slave unit checks whether that communication channel is vacant and, if it is O.K., it transmits a confirmation signal. When the master telephone set receives a confirmation signal from the slave unit, it executes an operation of line connection to the public telephone network (or switch). When the line connection is completed, the telephone set A of the slave telephone set is connected to the public telephone network like via the communication channel a. When the telephone set A of the slave telephone set and the public telephone network line are connected to each other, like the operation with the ordinary telephone set, the opposite side telephone number is dialed to start communication.

When the telephone set B is hooked off to make (or transmit) a telephone call to the opposite side while the telephone set A is in communication, a line connection request and the unit ID (XX) are transmitted on the control channel to the unit ID (YY). Subsequently, an operation like the operation until the completion of the line connection of the telephone set A is executed to obtain connection between the telephone set B and the public telephone network line. Now, the telephone set B is entitled to start communication.

When the telephone set B is hooked to discontinue its communication in the state that both the telephone sets A and B are in communication, a communication "off" request is transmitted from the telephone set B to the master telephone set. In response to receipt of the communication "off" signal, the master telephone set transmits a communication "off" signal to the telephone set B, thus ending the communication. The telephone set B is then restored to the stand-by state.

When the telephone set A is hooked on, a communication "off" request is also transmitted from the telephone set A to the master telephone set. In response to receipt of the communication "off " request, the master telephone set transmits a communication "off" signal to the telephone set A, thus ending the communication. The telephone set is then restored to the stand-by state.

By registering a plurality of IDS that are registered in each slave telephone set also in each of a plurality of master telephone sets, it is possible to let each slave telephone set make radio communication with a plurality of master telephone sets. For example, it is possible to make radio communication using the unit ID (XX) with a master telephone set and also make radio communication using the unit ID (YY) with a different master telephone set. Thus, the maximum number of radio lines possessed by the master telephone set can be used efficiently, thus reducing the traffic therein.

Responsive to arrival of a telephone call, the master telephone set informs the call arrival to the slave telephone set and also transmits its unit ID thereto. The slave telephone set checks whether the two unit IDS are identical. If it is O.K., the slave telephone set selects one of the plurality of unit IDs registered therein, and transmits the selected unit ID to the master telephone set. The master telephone set finds a vacant communication channel for communication, and informs the found communication channel to the slave telephone set. The slave telephone set checks whether the received communication channel is vacant. If it is O.K., the slave unit transmits a confirmation signal. When state ready for communication is brought about, the master telephone set sends out via the communication channel an instruction to ring the bell to the slave telephone set.

The slave telephone set may be set such that the bell of all or particular one or ones of the telephone sets connected to it is rang. The slave telephone set may be provided with a function of selecting a telephone set for ringing the bell. It is further possible to make use of dial-in or global call arrival by concluding a contract with a communication business dealer in advance.

As has been shown, in this embodiment, as set forth in claim 1, a plurality of unit IDs are preliminarily registered in the slave telephone set, and two or more communication channels can be assigned at a time to the slave telephone set for radio communication.

In addition, whenever radio communication is intended, the communication channel control unit 3 can flexibly select a unit ID corresponding to that radio communication. Thus, when two or more communication channels are used for communication, the radio communication on these communication channels can be dealt with (or controlled) independently of the slave telephone set. Thus, the master telephone set may be of the standard structure, no independent radio communication control system need be provided, and it is not possible to lead to complications of the unit construction of the master telephone set or cumbersomeness of the slave telephone set control operation.

Furthermore, since radio communication is controlled not for each slave set but for each radio communication (or communication channel) with unit IDs, by adapting each slave telephone set to be able to utilize both analog radio communication and digital radio communication, it is possible to permit selective use of the analog radio communication and the digital radio communication for each radio communication.

As has been described in the foregoing, according to the present invention, a plurality of unit IDs are preliminarily registered in each slave unit, and the unit IDs registered in each slave telephone set are also registered in the master telephone set. Thus, it is possible to assign two or more communication channels at a time for communication.

According to the present invention, whenever each slave telephone set makes radio communication with the master telephone set, it flexibly selects the unit ID corresponding to that radio communication. The radio communication thus can be controlled independently of the slave telephone set. Thus, the master telephone set may be the standard structure, no independent radio communication control system need be provided, and it is not possible to lead to complications of the unit construction of the master telephone set or cumbersomeness of the slave telephone set control operation.

In the radio communication system according to the present invention, a plurality of IDs registered in each slave telephone set are also registered in each of a plurality of master telephone sets. Each slave telephone set thus can make radio communication with a plurality of mater sets. Thus, the maximum number of radio lines possessed by the master telephone set can be used efficiently, thus reducing the traffic therein.

In the radio communication system according to the present invention, each slave telephone set can be utilized for both analog radio communication and digital radio communication. It is thus possible to selectively use the analog radio communication and the digital radio communication for the radio communication.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A radio telephone system, in which a slave telephone set is connected to a public telephone network through radio communication with a master telephone set, wherein:

a line adopted to provide a plurality of independent communications is connected to the public telephone network side of the master telephone set;

the slave telephone set connecting a plurality of telephone sets;

a plurality of unit IDs are registered in the slave telephone set, and said plurality of unit IDs are also registered in the master telephone set, the slave telephone set independently communicating over a plurality of channels via the master telephone set with the public telephone network, and when a communication request is issued from a telephone set from said plurality of telephone sets during communication with the master telephone set via the radio communication channel using one unit ID, the slave telephone set establishes a communication with the public telephone network by concurrently connecting the master telephone set via the radio communication channel using another unit ID.

2. The radio telephone system according to claim 1, wherein each slave telephone set is capable of utilizing both analog radio communication and also digital communication.

3. A radio telephone communications method, in which a slave telephone sets is connected to a public telephone network through radio communication with a master telephone set and a plurality of unit IDs are preliminarily registered in the slave telephone set, and the plurality of unit IDs are also registered in the master telephone set, the method comprising:

in response to hooked off of a first telephone set connected to the slave telephone set to make a telephone call, transmitting a line connection request signal and selected unit ID among the preliminarily registered unit IDs on a control channel to the master telephone set;

in response to receipt of the line connection request and the unit ID, checking whether the received unit ID is of its own slave telephone set by the master telephone set;

if the unit IDs are identical, finding a vacant communication channel and assigning this vacant communication channel to the slave telephone set;

in response to the assignment of communication channel, checking whether that communication channel is vacant and, if it is vacant, transmitting a confirmation signal by the slave telephone set; and in response to receipt of the confirmation signal from the slave unit, executing operation of line connection to the public telephone network by the master telephone set, wherein the slave telephone set simultaneously communicates over a plurality of channels via the master telephone set with the public telephone network, and when the communication request is issued from the telephone set during communication with the master telephone set via the radio communication channel using one unit ID, the slave telephone set establishes a communication with the public telephone network by connecting the telephone set via the radio communication channel using another unit ID.

4. The radio telephone system according to claim 3, wherein when a second telephone set is hooked off to make a telephone call while the first telephone set is in communication, a line connection request and the unit ID are transmitted on the control channel to the unit ID; and the line connection like for the first telephone set is executed to obtain connection between the second telephone set and the public telephone network line.

5. The radio telephone system according to claim 3, wherein when a second telephone set is hooked off to discontinue its communication in the state that both the first and second telephone sets are in communication, a communication "off" request is transmitted from the second telephone set to the master telephone set; and in response to receipt of the communication "off" signal, the master telephone set transmits a communication "off" signal to the second telephone set, thus ending the communication and restore the second telephone set to the stand-by state.

6. The radio telephone system according to claim 3, wherein when the first telephone set is hooked on, a communication "off" request is transmitted from the first telephone set to the master telephone set; and in response to receipt of the communication "off" request, the master telephone set transmits a communication "off" signal to the first telephone set, thus ending the communication and restore the telephone set to the stand-by state.

7. A radio telephone communications method, in which a plurality of slave telephone sets is connected to a public telephone network through radio communication with a master telephone set and a plurality of unit IDs are preliminarily registered in each of the slave telephone sets, and the plurality of unit IDs is also registered in a plurality of master telephone sets, the method comprising:

responsive to arrival of a telephone call, informing the call arrival to a slave telephone set and transmitting its unit ID by the master telephone set;

checking whether the transmitted unit D matches at least one of the plurality of registered unit IDs for the slave telephone set, selecting one of the plurality of unit IDs registered if a match is determined, and transmitting the selected unit ID to the master telephone set by the slave telephone set;

finding a vacant communication channel for communication and informing the found communication channel to the slave telephone set by the master telephone set;

checking whether the received communication channel is vacant and if it is vacant, transmitting a confirmation signal by the slave telephone set; and sending out via the communication channel an instruction to ring the bell to the slave telephone set when state ready for communication is brought about, wherein the slave telephone set is adapted to simultaneously communicate over a plurality of channels via the master telephone set with the public telephone network, and when the slave unit receives a communication request from a telephone set connected to the slave unit during communication with the master telephone set via the radio communication channel using one unit ID, the slave telephone set establishes a communication with the public telephone network by connecting the telephone set via the radio communication channel using another unit ID.

8. The radio telephone system according to claim 7, wherein the master telephone set sends out via the communication channel an instruction to ring the bell to the slave telephone set.

9. A radio telephone system, in which a slave telephone sets is connected to a public telephone network through radio communication with a master telephone set, the system comprising:

a line adopted to provide a plurality of simultaneous communications is connected to the public telephone network side of the master telephone set;

the slave telephone set connecting a plurality of telephone sets:

a plurality of unit IDs registered in the slave telephone set; the plurality of unit IDs are also registered in the master telephone set;

means for transmitting a line connection request signal and selected unit ID among the registered unit IDs on a control channel to the master telephone set, in response to hooked off of a first telephone set connected to the slave telephone set to make a telephone call;

means for checking by the master telephone set whether the received unit ID is of the master telephone set's slave telephone, in response to receipt of the line connection request and the unit ID;

means for finding a vacant communication channel and assigning this vacant communication channel to the slave telephone set, if the unit ID is of the master telephone's slave telephone;

means for checking whether the assigned communication channel is vacant and, if it is vacant, transmitting a confirmation signal by the slave telephone set, in response to the assignment of communication channel; and means for executing operation of line connection to the public telephone network by the master telephone set, in response to receipt of the confirmation signal from the slave unit, the slave telephone set simultaneously communicating over a plurality of channels via the master telephone set with the public telephone network, and when a communication request is issued from a telephone set from said plurality of telephone sets during communication with the master telephone set via the radio communication channel using one unit ID, the slave telephone set establishes a communication with the public telephone network by connecting the telephone set via the radio communication channel using another unit ID.

10. A radio telephone system, in which a plurality of slave telephone sets is connected to a public telephone network through radio communication with a master telephone set, wherein:
- a line of a plurality of simultaneous communications is connected to the public telephone network side of the master telephone set;
- a slave telephone set connects a plurality of telephone sets;
- a plurality of unit IDs are registered in each of the slave telephone sets, and the plurality of unit IDs are also registered in a plurality of master telephone sets,
- the slave telephone set is capable of simultaneous communications of a plurality of channels via a master telephone set from the plurality of mater telephone sets with the public telephone network,
- and when the communication request is issued from a telephone set from said plurality of telephone sets during communication with the master telephone set via the radio communication channel using one unit ID, the slave telephone set makes communication with the public telephone network by connecting the telephone set via the radio communication channel using another unit ID.

11. The radio communication system according to claim 10, wherein each slave telephone set is capable of utilizing both analog radio communication and also digital communication.

12. A radio telephone system, in which a plurality of slave telephone sets is connected to a public telephone network through radio communication with a master telephone set, wherein:
- a line of a plurality of simultaneous communications is connected to the public telephone network side of the master telephone sets;
- a slave telephone set connects a plurality of telephone sets;
- a plurality of unit IDs are preliminarily registered in each of the slave telephone sets, and the plurality of unit IDs are also registered in the master telephone set and whenever each slave telephone set makes radio communication with the master telephone set, a unit ID corresponding to the radio communication is selected, and the plurality of unit IDs registered in each slave telephone set is registered in a plurality of master telephone sets; and
- the slave telephone set is capable of simultaneous communications of a plurality of channels via the master telephone set with the public telephone network, and when the communication request is issued from a telephone set from said plurality of telephone sets during communication with the master telephone set via the radio communication channel using one unit ID, the slave telephone set makes communication with the public telephone network by connecting the telephone set via the radio communication channel using another unit ID.

13. The radio communication system according to claim 12, wherein each slave telephone set is capable of utilizing both analog radio communication and also digital communication.

* * * * *